United States Patent [19]
Park et al.

[11] Patent Number: 4,758,462
[45] Date of Patent: Jul. 19, 1988

[54] OPAQUE FILM COMPOSITES AND METHOD OF PREPARING SAME

[75] Inventors: Hee C. Park, Pittsford; Joseph J. Spitz; Charles R. Ashcraft, both of Victor, all of N.Y.

[73] Assignee: Mobil Oil Corporation, New York, N.Y.

[21] Appl. No.: 901,697

[22] Filed: Aug. 29, 1986

[51] Int. Cl.$^4$ .......................... B32B 3/26; B32B 7/02; B32B 31/00

[52] U.S. Cl. ..................................... 428/213; 156/229; 264/210.7; 428/313.3; 428/315.5; 428/317.9; 428/516; 428/910

[58] Field of Search .................. 428/213, 313.3, 313.5, 428/313.9, 315.5, 317.9, 516, 910; 264/210.7; 156/229

[56] References Cited

U.S. PATENT DOCUMENTS

| | | | |
|---|---|---|---|
| 3,697,367 | 10/1972 | Schwarz | 428/398 |
| 3,795,720 | 1/1974 | Schwarz | 521/138 |
| 4,118,438 | 10/1978 | Matsui et al. | 428/338 |
| 4,377,616 | 3/1983 | Ashcraft et al. | 428/213 |
| 4,582,752 | 4/1986 | Duncan | 428/317.9 |
| 4,626,460 | 12/1986 | Duncan | 428/313.3 |
| 4,632,869 | 12/1986 | Park et al. | 428/317.9 |

*Primary Examiner*—William J. Van Balen
*Attorney, Agent, or Firm*—Alexander J. McKillop; Michael G. Gilman; Howard M. Flournoy

[57] ABSTRACT

An opaque, biaxially oriented film structure is described which comprises:

an expanded thermoplastic polymer matrix core layer within which is located a minor amount of a light-absorbing pigment and a strata of voids; positioned at least substantially within at least a substantial number of said voids is at least one void-initiating particle which is phase distinct and incompatible with the matrix material, the void space occupied by said particle being substantially less than the volume of said void, with one generally cross-sectional dimension of said particle, at least approximating a corresponding cross-sectional dimension of said void; the population of voids in said core and the thickness of said core being such as to cause a degree of opacity of less than 15% light transmission; and at least one void-free thermoplastic skin layer affixed to a surface of the core layer, said skin layer(s) being of a thickness such that the outer surfaces thereof do not, at least substantially, manifest the surface irregularities of said core layer.

40 Claims, No Drawings

OPAQUE FILM COMPOSITES AND METHOD OF PREPARING SAME

BACKGROUND OF THE INVENTION

This invention relates to the field of polymer films of enhanced opacity and to a method of making said film structures.

It is known that thermoplastic polymers can be loaded with inert fillers, cast into films, and thereafter stretched to form oriented thermoplastic films. This statement is generally true, however, it must be realized that the particular components employed and the specific process parameters employed, particularly when control is difficult, can result in significantly different end products or significantly contribute to the success or failure of obtaining a desired result. For example, U.S. Pat. No. 4,118,438 teaches the use of some materials similar to those contemplated by the present invention, however, the object of the patentees is diameterically opposed to the object of the present invention. This reference is concerned with a transparent polypropylene film containing fine particles of an incompatible polymer dispersed therein. This film manifests bumps or surface projections caused by the dispersed particles and the patentees maintain that this gives the transparent film, non-blocking characteristics. In U.S. Pat. Nos. 3,697,367 and 3,795,720, there is disclosed a process for preparing an uniaxially oriented mixed polymer system. The resulting material has utility as a paper substitute and can be formed into fibers for making sheet paper.

U.S. Pat. No. 4,377,616, the contents of which are incorporated by reference herein, discloses an opaque biaxially oriented polymer film structure comprising a thermoplastic polymer matrix core layer possessing numerous voids, a substantial number of which contain at least one spherical void-initiating particle, and transparent thermoplastic skin layers adhering to the surfaces of the core layer. The unique structure of the core layer imparts a much higher degree of opacity, possibly due to the effects of light scattering, than that possible by the use of opacifying pigment alone. There is no disclosure or suggestion in U.S. Pat. No. 4,377,616, however, that the opacity of such core layer and skin layers could be so dramatically increased by adding minor amounts of light absorbing colored pigment to the film structure. In fact U.S. Pat. No. 4,377,616 does not even refer to light absorbing colored pigment and teaches away from its use with the statement that the presence of pigment contributes little to the opacity of the system.

SUMMARY OF THE INVENTION

It is an object of the present invention to impart significantly reduced light transmission characteristics to polymer film structures.

It is another object of this invention to provide maximum opacity for polymer film structures at minimum levels of light absorbing pigment.

It is a further object of this invention to obtain opacities of up to 85% or more, i.e. light transmission of 15% or less for polymer film structures.

It is another object of this invention to present a process for preparing such film structures. Accordingly, the film structure of the present invention is an opaque biaxially oriented polymer film structure of lustrous satin appearance comprising:

an expanded thermoplastic polymer matrix core layer within which is located a minor amount of a light absorbing colored pigment and a strata of voids;

positioned at least substantially within at least a substantial number of said voids is at least one void-initiating particle which is phase distinct and incompatible with the matrix material, the void space occupied by said particle being substantially less than the volume of said void, with one generally cross-sectional dimension of said particle, at least approximating a corresponding cross-sectional dimension of said void;

void-free, transparent, thermoplastic skin layers adhering to the surfaces of said core layer, said skin layers being of a thickness such that the outer surfaces thereof do not, at least substantially, manifest the surface irregularities of said core layer;

the population of voids in said core and the thickness of said core being such as to cause a degree of opacity of less than about 15% light transmission; said structure having a gloss measurement greater than 80%.

The process for preparing the high opacity film structure of the present invention comprises:

mixing a first thermoplastic polymeric material with a second material incompatible with said first material to form a core mixture, said second material being of a higher melting point or having a higher glass transition temperature than said first material;

heating the core mixture to a temperature at least above the melting point of said first material;

dispersing said second material uniformly throughout the molten first material in the form of microspheres;

extruding the core mixture in the form of a core layer included in the melt mixture is from about 2 to about 12 wt. % and preferentially 4–9% based on the particular core material of a light absorbing pigment and intimately admixing it with said core material;

adherently applying transparent thermoplastic skin films to the surfaces of said core layer in thicknesses which will not ultimately manifest surface irregularities of said core layer;

biaxially orienting the film structure at a temperature and to an extent to form opacifying voids in said core layer so as to optimize the degree of opacity and enhance its physical characteristics.

DESCRIPTION OF PREFERRED EMBODIMENTS

In order to achieve the unique film structure of the present invention, it is important that a particular thickness relationship exist between the thickness dimension of the core and the thickness dimension of the skin layer or layers which can be transparent or pigmented for further augmented opacity. It is preferred that the core thickness be from about 30 to about 85% of the overall structure. This, in combination with the population and configuration of the voids in a structure at least about 0.5 mils thick, will materially contribute to the overall degree of opacity of the structure. Likewise, by maintaining the skin thickness within a particular range in relation to the overall structure and to the thickness of the core layer, the overall combination results in the unique film combination. It is preferred that the combined skin thickness be about 15 to about 70% of the overall film structure. It is important that the skin layers be sufficiently thick so that the outer surfaces thereof do not manifest the irregularities or surface projections of the core material. It is understood that the film structure may consist (100%) entirely of the described core or it may consist of the core and one layer or the core and multiple layers.

It is preferred that the average diameter of the void-initiating particles be from about 0.1 to about 10 microns. These particles may be of any desired shape although it is preferred that they be substantially spherical in shape. This does not mean that every void is the same size. It means that, generally speaking, each void tends to be of like shape when like particles are used, even though they vary in dimensions. Ideally, these voids assume a shape defined by two opposed and edge contacting concave disks.

Experience has shown that optimum characteristics of opacity and satin-like appearance is obtained when the two average major void dimensions are greater than about 30 microns.

The void-initiating particle material, as indicated above, should be incompatible with the core material, at least at the temperature of biaxial orientation.

The core has been described above as being a thermoplastic polymer matrix material within which is located a strata of voids. From this it is to be understood that the voids create the matrix configuration. The term "strata" is intended to convey the understanding that there are a large number of voids creating the matrix and the voids themselves are oriented so that the two major dimensions are aligned in correspondence with the direction of orientation of the polymeric film structure. After each void has been formed through the initiation of the described particle, the particle generally contributes little else to the system. This is because its refractive index can be close enough to the matrix material that it makes no contribution to opacity. When this is the case, the opacity is principally a function of the light scattering effect which occurs because of the existence of the voids in the system.

When light absorbent colored pigment is added to the expanded layer of a film an unexpected increase in opacity occurs. Usually from 3 to about 10 wt. % or more and preferably 4 to about 8% of light absorbing pigment is added. With 2% pigment in a nonexpanded film a light transmission (LT) of 46% is obtained. Placing 2% pigment in the nonexpanded skin of an expanded core film yields a LT of 18%, placing the same amount of pigment in the expanded core with nonpigmented skins yields a LT of 10% or a decrease of 8 LT units. (Also note that at a 4% pigment loading when pigment is placed in the skin only a 6 unit decrease in LT is seen but when the same amount is placed in the expanded core a 7 LT unit decrease is observed.) It is clear, therefore, that a lot more pigment is required in the skin only to achieve opacity comparable to that obtained for a specific pigment concentration in the core.

The concentration of pigment in each case is based on the total weight of the sample. Any suitable light absorbent colored pigment may be used, e.g., brown, green, black, red or blue, etc. Such pigments may be selected from those conventionally used in the dyeing and/or coloring of synthetic resins, industrial coatings and paints, and may be organic or inorganic.

Suitable colors and particular pigment materials are readily available through commercial channels. A list of various pigments are disclosed in Vol. 17, pages 788–889, *Kirk Othmer Encyclopedia of Chemical Technology*, 3rd Edition C 1982. Some exemplary pigments are carbon black, brown iron oxide iron blue, etc. Accordingly, light absorbing pigments as used herein are understood to mean "colored" light absorbing pigments.

When pigments such as $T_iO_2$ are used they function primarily to mask contact clarities, since they are primarily light reflecting pigments, and as such can add little to the measured opacity of the film structure. It is noted that the greatest degree of opacity is achieved by using an expanded film, a light absorbent colored pigment and a cavitated core. The pigment material is present in such a particle size, shape and amount that it does not, in any material sense, by itself contribute any void initiation.

A typical void of the core is defined as having major dimensions X and Y and minor dimension Z, where dimension X is aligned with machine direction orientation, dimension Y is aligned with transverse direction orientation and dimension Z approximately corresponds to the cross-sectional dimension of the spherical particle which initiated the void.

It is a necessary part of the present invention that orientation conditions be such that the X and Y dimensions of the voids of the core be major dimensions in comparison to the Z dimension. Thus, while the Z dimension generally approximates the cross-sectional dimension of the spherical partical initiating the void, the X and Y dimensions must be significantly greater.

By way of illustration, room temperature biaxial orientation of a polypropylene matrix containing polybutylene terephthalate (PBT) spheres of the size and amount contemplated herein, could not produce the claimed structure. Either void splitting will occur, or, voids of insignificant size would result. As shown in the examples, infra, polypropylene must be oriented at a temperature significantly higher than its glass transition temperature. The temperature conditions must permit X and Y to be at least several multiples of the Z dimension without void splitting at least to any significant degree. If this is accomplished, optimum physical characteristics, including low water vapor transmission rates and a high degree of light scattering is obtained without void splitting or film fibrillating.

As indicated above, the matrix polymer and the void initiating particle must be incompatible and this term is used in the sense that the materials are two distinct phases. The spherical void initiating particles constitute a dispersed phase throughout the lower melting polymer which polymer will, ultimately, upon orientation, become a void filled matrix with the spherical particles positioned somewhere in the voids.

As a result of the biaxial orientation of the film structure described herein, in addition to opacifying the core layer of the structure, the orientation improves other physical properties of the composite layers such as, flex-cracking resistance, Elmendorff tear strength, elongation, tensile strength, impact strength and cold strength properties. The resulting film can have, in addition to a rich, high quality appearance and excellent opacifying characteristics, low water vapor transmission rate characteristics and low oxygen transmission rate characteristics. This makes the film ideally suited for packaging food products, including liquids. The film also has attractive utility as a decorative wrap material.

It is believed that because of the comparative sphericity of the void-initiating particles, the voids are closed cells. This means that there is virtually no path open from one side of the core to the other through which liquid or gas can traverse.

The void-initiating particles can be organic or inorganic, preferably, they are substantially spherical in shape and within the preferred particle size range so as to initiate the formation of a void, which in a significant number of cases, has a lens-like shape, that is, a lens of the biconvex shape. When a polymeric material is contemplated as the void-initiating particle, it can be a polymer which is co-melted with the polymer of the matrix or core. In this case, it is necessary for it to have a sufficiently higher melting point than the core polymer and be incompatible and capable of assuming a dispersed phase of small particles as the temperature of the co-melted mix is reduced. It is also contemplated that the void initiating particles can be preformed and then uniformly dispersed into a melt of, e.g., polypropylene. This has the advantage of not having to subject the matrix polymer to the temperature of a much higher melting polymer. In this manner, any thermal degradation of the matrix polymer is avoided.

It is believed that because of the number, the shape and the orientation strata-wise of matrix voids, a significantly enhanced light scattering effect is obtained by virtue of the present invention. This effect is further enhanced or magnified by the use of the two transparent skin layers of the size relationship mentioned above.

When preformed spheres, for example, are employed, it is the shape and size of the sphere that is important rather than the chemical nature of the material, per se. Thus, solid or hollow organic or inorganic spheres of any type can be employed. The light scattered in a particular void is additionally either absorbed or reflected by the void initiating sphere and the light absorbing pigment. Inorganic materials include solid or hollow preformed glass spheres, metal beads or spheres, ceramic spheres, etc. In fact, any material which can be formed into spheres or other suitable shape without causing thermal degradation to the core material is contemplated.

Examples of a thermoplastic resin which can be the dispersed phase within the matrix material, are the polyesters, such as polybutylene terephthalate and polyethylene terephthalate, polycarbonates, polysulfones, acetals, acrylic resins, nylon, etc.

By the technique of the present invention, light transmission through the film structures contemplated herein can be reduced to about 15% or less. This would be true in a film having an overall thickness of at least 1.5 mils where the core portion of this is at least 60% and the individual skin layers are 20%.

While the preferred particle size is to be from about 0.5 to about 10 microns, it is particularly preferred that the particle size range from about 0.75 to about 4 microns. The void initiating particles can be present in up to about 20% by weight of the core layer prior to orientation, a preferred range being from 2 to about 7 percent by weight. As stated hereinabove, the light absorbing colored pigment particles can be present in up to about 12% of the core material with a preferred range being from 4 to about 9 wt. % of the core. The pigment particles may be of any size insufficient to cause cavitation. Accordingly, the pigment particles occupy substantially less space than the void-initiating particles. The pigment particles may be conveniently added to the core only, to the skins only or to one skin only, or to any combination of the above, preferably, they are added to the core only.

For convenience and more precise control of the formulation and character of the core layer, a master batch technique can be employed either in the case of forming the spherical particles in situ or in adding preformed spheres to the molten core matrix material. After the formation of a master batch, appropriate dilution of this system can be made by adding additional thermoplastic core matrix material until the desired proportions are obtained.

The core material and the skin material may be coextruded. Thereafter, biaxial orientation is carried out to an extent and at a temperature calculated to obtain the maximum degree of opacity without any significant sacrifice in the physical characteristics, including appearance, of the film structure. Obviously, as the materials employed change, the conditions of biaxial orientation will change. By way of exemplification, when employing polypropylene as the material of the core matrix and of the transparent skin layers, and when employing PBT as the void initiating particles, a machine direction orientation of from 4 to 8 times and a transverse direction orientation of from about 4 to 10 times, at a drawing temperature of from 100° C. to 170° C. to yield a biaxially oriented film of from 0.7 to 5 mils of overall thickness can be obtained.

In the following Examples, characteristics of the film were measured by ASTM method D 1003-61 entitled "Test for Haze and Luminous Transmittance of Transparent Plastics".

EXAMPLE 1

An isotactic polypropylene (MP 165° C. and a melt flow rate of 4.5) containing 1.4% $TiO_2$ by weight (light reflecting pigment) was melt extruded in an extruder provided with a screw of L/D ratio of 20/1. The extruder temperature profiles ranged from 190° C. to 220° C. The extrudate was quenched and subsequently biaxially oriented five by nine times using a commercially available sequential biaxially orienting apparatus. The MD orientation temperature ranged from 105° C. to 135° C. and those of TD were from 150° C. to 170° C.

The resulting 1.5 mil film had a 72% light transmission and a gloss of 70%.

EXAMPLE 2

The procedure of Example 1 was followed except that 2.8 weight percent $TiO_2$ based on the total structure was added.

The resulting 1.5 mil film had a 62% light transmission.

EXAMPLE 3

The procedure of Example 1 was repeated except that various levels of light absorbing brown colored pigments were added to the isotactic polypropylene in place of the $TiO_2$.

Table 1 summarizes the results showing % light transmission on various colored pigment (brown; brown iron oxide) loading amounts.

TABLE 1

| Pigment Loading Amount, wt. % | Light Transmission |
|---|---|
| 1.4 | 59 |
| 2.8 | 37 |
| 4.4 | 25 |
| 8.8 | 8 |

EXAMPLE 4

A mixture of isotactic polypropylene (92 parts, MP 165° C. and a melt flow rate of 4.5), PBT (6 parts, MP 227° C.) and 2% TiO$_2$ was melted in an extruder provided with a screw of L/D ratio of 20/1. A second extruder was in association with this first mentioned extruder and supplied with the same polypropylene but without the PBT and TiO$_2$ present. A melt coextrusion was carried out while maintaining the barrel temperature for the core material ranging from 190° C. to 220° C. The barrel temperature for the polypropylene to be extruded as the skin layers was maintained at 220° C. A three-layer film structure was coextruded with a core thickness 70% of the total extruded thickness. The skin layers were each approximately 15% of the total thickness. The unoriented film measured approximately 40 mils in thickness. This sheet was subsequently oriented five by nine times using a commercially available sequential biaxially orienting apparatus.

The resulting 1.5 mil film structure had a 26% light transmission and a gloss of 115%.

The TiO$_2$ aids in increasing the contact opacity of the film but does not measureably aid in the measured opacity at lower levels of TiO$_2$. Opacities of from 72% light transmission to about 26% light transmission have been achieved using core formulations containing from about 87 to 96% polypropylene and from 3 to 10% PBT and from about 1 to about 3% TiO$_2$.

EXAMPLE 5

The procedure of Example 4 was repeated except that various levels of light absorbing colored pigment (brown iron oxide) were added in the skin resin.

The resulting % light transmission on the pigment loading amount based on total film structure is listed in Table 2.

TABLE 2

| Pigment loading Amount, Wt. % | % Light Transmission |
| --- | --- |
| 1.9 | 19 |
| 2.8 | 17 |
| 4.2 | 11 |

EXAMPLE 6

The procedure of Example 4 was followed except that various levels of the light absorbing colored pigment were added to the core formulation. The % light transmission on the pigment loading amount based on total film structure is summarized in Table 3.

TABLE 3

| Pigment Loading Amount, Wt. % | % Light Transmission |
| --- | --- |
| 1.4 | 13 |
| 2.8 | 7 |
| 4.2 | 3 |

The data disclosed hereinabove reveal without question the surprising and unexpected increase in opacity or decrease in light transmission of light absorbing pigments versus prior art light reflecting pigments. For example, various loading amounts and locations of light absorbing pigments in accordance with the invention and a prior art light reflecting pigment were compared. The results whether it is light reflecting or absorbing reveal that the location of the pigment, whether it is light reflecting or absorbing, greatly determines its opacifying effect.

The data clearly show the differences and unexpected superiority of light absorbing pigment versus light reflecting pigment. The light absorbing pigment is unquestionably more effective than the light reflecting TiO$_2$ for light blockage. Examples 1 and 2 are of uncavitated film structure with minor amounts of TiO$_2$; Example 3 is of the same film containing various levels of colored pigment (brown iron oxide). At equivalent pigment (light absorbing-brown; light reflecting-TiO$_2$) levels the light absorbing pigment provides superior opacity. Note Example 2 which provide a LT of 62% at 2.8% TiO$_2$ and Item 2 of Table 1 where the pigment in accordance with the invention provides an LT of 37% at 2.8%.

Examples 4, 5 and 6 are vaious cavitated film structures containing light absorbing pigment as disclosed herein, Examples 4 and 6 were core only pigment, and Example 5 was skin only pigment. At 4.2%, pigment loading the core only pigment film structure permitted almost 75% less light transmission. In comparison with the uncavitated film structure at 2.8% pigment, the cavitated pigment core (Table 3) permitted about 5 times less light transmission than did the non-cavitated core of Example 3 (Table 1). The magnitude of the change in light transmission for light reflecting pigment in the skin versus expanded core is highly significant and quite unexpected.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An improved opaque biaxially oriented polymeric film structure comprising:

an expanded core thermoplastic polymer matrix material within which is located a strata of voids; positioned at least substantially within at least a substantial number of each of said voids, is at least one void-initiating solid particle which is phase distinct and incompatible with said matrix material, the void-space occupied by said particle being substantially less than the volume of said void, with one generally cross-sectional dimension of said particle at least approximating a corresponding cross-sectional dimension of said void and within which is a dispersion of a minor amount of a light absorbing colored pigment; and at least one void-free, transparent, thermoplastic skin layer adhering to the surface of said core layer, said skin layer being of a thickness such that the outer surfaces thereof do not, at least substantially, manifest the surface irregularities of said core layer;

the population of voids in said core being such as to cause a degree of opacity having a light transmission of less than about 15%.

2. The structure of claim 1 wherein said particle is inorganic.

3. The film structure of claim 1 wherein said particle is an organic material.

4. The structure of claim 1 wherein said void-initiating particle is substantially spherical.

5. The film structure of claim 3 wherein said organic material is a polymer.

6. The structure of claim 1 wherein said structure is a coextruded structure.

7. The structure of claim 1 wherein said structure is a laminated structure.

8. The structure of claim 1 wherein the core thickness is from about 40 to about 85 wt. % of said structure.

9. The structure of claim 1 wherein the pigment particles are of insufficient diameter to cause cavitation and said light absorbing colored pigment is substantially dispersed throughout said core only.

10. The structure of claim 1 wherein the pigment is selected from brown, black, blue, green and red colored pigments.

11. The structure of claim 10 wherein the color of said pigment is brown.

12. The structure of claim 1 wherein said skin layers are of the same polymeric material as said matrix material.

13. The structure of claim 1 wherein said skin layers are of a different polymeric material from said matrix material.

14. The structure of claim 1 wherein said voids have a dimension of X, Y and Z, wherein dimensions X and Y are major dimensions and dimension Z is a minor dimension at least generally corresponding to the diameter of said spherical particle.

15. The structure of claim 12 wherein dimensions X and Y are multiples of dimension Z.

16. The structure of claim 1 wherein the particles have an average diameter of about 0.5 to about 10 microns.

17. The structure of claim 1 wherein said core and skin polymer or polymers are polyolefin.

18. The structure of claim 17 wherein said polyolefin is polypropylene.

19. The structure of claim 18 wherein the substantially spherical particles are of a polyester.

20. The structure of claim 19 wherein said polyester is polybutylene terephthalate.

21. The structure of claim 1 wherein said pigment particles are dispersed throughout the skin layers or layer and the core.

22. A process for preparing a film structure comprising:
mixing a major proportion of a first thermoplastic polymeric material with a minor proportion of a second material of a higher melting point or having a higher glass transition temperature than said first material;
heating the core mixture to a temperature of at least above the melting point of said first material;
dispersing said second material uniformly throughout the molten first material in the form of microparticles;
dispersing and intimately admixing therein an effective amount of a light absorbing colored pigment;
forming a biaxially oriented core layer of said core mixture, said oriented layer having transparent thermoplastic skin film(s) adherent thereto;
said core layer having been biaxially oriented at a temperature and to a degree to form a strata of opacifying closed cell voids of dimensions X, Y and Z wherein dimensions X and Y are major dimensions and dimension Z is a minor dimension at least generally corresponding to the diameter of said microparticles.

23. The process of claim 21 wherein the skin films or films are at least substantially void-free and of a thickness which will not manifest surface irregularities of said core layer.

24. The process of claim 23 wherein said core layer and skin films are formed by coextrusion.

25. The process of claim 24 wherein said core layer and skin films are biaxially oriented after said skin film(s) are adhered to said core layer.

26. The process of claim 25 wherein the biaxial orientation is simultaneous.

27. The process of claim 25 wherein the biaxial orientation is sequential.

28. The process of claim 24 wherein said coextrusion is sequential with said skin extrusion following said core extrusion.

29. The process of claim 22 wherein said first thermoplastic polymeric material is a polyolefin.

30. The process of claim 29 wherein said polyolefin is polypropylene.

31. The process of claim 29 wherein said second material is a polyester.

32. The process of claim 31 wherein said polyester is polybutylene terephthalate.

33. The process of claim 32 wherein said PBT and said polypropylene are co-melted.

34. The process of claim 33 wherein said skin film is polypropylene.

35. A process for preparing a film structure comprising:
mixing a major proportion of polypropylene with a minor proportion of a PBT to form a core mixture;
heating the mixture to effect melting of both materials;
uniformly dispersing said PBT throughout the molten polypropylene in the form of microparticles;
mixing a minor proportion of a light absorbent colored pigment with said melt and uniformly dispersing an effective amount of said light absorbent pigment throughout said melt mixture;
reducing the temperature to below the melting point of the PBT while maintaining the polypropylene molten;
melting a separate proportion of polypropylene;
coextruding said core mixture with the melted polypropylene to form a core layer having skin films of polypropylene on both sides thereof;
biaxially orienting the film structure at a temperature and to a degree to form a strata of opacifying closed cell voids in said core layer, said voids having dimensions X, Y and Z, wherein dimensions X and Y are major dimensions and dimension Z is a minor dimension at least generally corresponding to the diameter of said microparticles;
said skin films being at least substantially void-free and of a thickness which will not manifest surface irregularities of said core layer.

36. The process of claim 33 wherein said orientation temperature is greater than about 100° C.

37. The process of claim 34 wherein said structure is oriented to form about 4 to about 10 times in both directions.

38. The film structure of claim 1 wherein said structure does not have any skin films adherent thereto.

39. The structure of claim 1 wherein the skin layers are of a thickness which may manifest surface irregularities of the core layer.

40. The structure of claim 1 wherein said light absorbing colored pigment is in at least one skin layer.

* * * * *